(12) United States Patent
Trussell (10) Patent No.: US 9,689,143 B1
(45) Date of Patent: Jun. 27, 2017

(54) POLY PIPE UNROLLING AND PLACEMENT DEVICE

(71) Applicant: Dennis Trussell, DeWitt, AR (US)

(72) Inventor: Dennis Trussell, DeWitt, AR (US)

( * ) Notice: Subject to any disclaimer, the term of this patent is extended or adjusted under 35 U.S.C. 154(b) by 0 days.

(21) Appl. No.: 14/972,544

(22) Filed: Dec. 17, 2015

Related U.S. Application Data (60) Provisional application No. 62/093,592, filed on Dec. 18, 2014.

(51) Int. Cl.
*E02F 5/10* (2006.01)
*E02F 5/12* (2006.01)
*F16L 1/032* (2006.01)

(52) U.S. Cl.
CPC .................. *E02F 5/10* (2013.01); *E02F 5/12* (2013.01); *F16L 1/032* (2013.01)

(58) Field of Classification Search
CPC ..... E02F 5/10; E02F 5/12; E02F 5/102; F16L 1/028
USPC .................................. 405/180, 181, 182, 183
See application file for complete search history.

(56) References Cited

U.S. PATENT DOCUMENTS

| | | | | |
|---|---|---|---|---|
| 1,886,511 A * | 11/1932 | Gledhill | ................... | E02F 5/102 405/181 |
| 2,692,092 A * | 10/1954 | Kinsinger | ............... | E02F 5/102 172/699 |
| 2,722,181 A * | 11/1955 | Hash | ....................... | E02F 5/102 172/443 |
| 3,391,545 A * | 7/1968 | Linneman | ................ | E02F 5/102 405/157 |
| 3,400,542 A * | 9/1968 | Davis | ....................... | E02F 5/102 242/390.2 |
| 3,417,571 A * | 12/1968 | Kelley | ..................... | E02F 5/102 37/370 |
| 4,114,391 A * | 9/1978 | Kahley, Sr. | ............. | E02F 5/102 111/199 |
| 4,159,190 A * | 6/1979 | Duggins | ................. | E02D 3/032 405/179 |
| 4,373,833 A * | 2/1983 | Watanabe | .............. | A01G 17/16 111/109 |
| 4,397,585 A * | 8/1983 | Fouss | ....................... | H02G 1/06 405/174 |
| 4,447,173 A * | 5/1984 | Schultz | .................... | E02F 5/102 405/174 |
| 4,461,598 A * | 7/1984 | Flechs | ...................... | E02F 5/102 111/165 |

(Continued)

FOREIGN PATENT DOCUMENTS

WO     WO 9604500 A1 *    2/1996    ............. E02F 5/102

*Primary Examiner* — Frederick L Lagman
(74) *Attorney, Agent, or Firm* — Keisling + Pieper PLC; David B. Pieper (57) ABSTRACT

A poly pipe installation device constructed from a frame supporting a trenching tool for making a trench with side berms, a pipe roll supporting axles for a poly pipe roll so that the roll can be unwound to place the poly pipe into the trench. The poly pipe roll unrolls the pipe past a guide and under a wheel to position the pipe in the trench where it then partially buried with dirt drug off of the berms with angled drag chains. The poly pipe roll being unrolled is one of up to four rolls that are supported off of a horizontal turntable rotates each roll into the unrolling position and that also supports and stores multiple pipe rolls so that long runs of pipe can be laid quickly.

1 Claim, 6 Drawing Sheets

(56) References Cited

U.S. PATENT DOCUMENTS

| | | | | |
|---|---|---|---|---|
| 5,526,759 A * | 6/1996 | Cox | ............... | A01K 39/014 |
| | | | | 111/199 |
| 6,158,925 A * | 12/2000 | Schleining | ............... | E02F 5/226 |
| | | | | 37/142.5 |
| 6,193,440 B1 * | 2/2001 | Pidgeon | ............... | E02F 5/06 |
| | | | | 37/106 |
| 7,614,827 B1 * | 11/2009 | Makk | ............... | A01G 25/06 |
| | | | | 405/180 |
| 2006/0233615 A1 * | 10/2006 | Searby | ............... | E02F 5/08 |
| | | | | 405/180 |
| 2007/0292211 A1 * | 12/2007 | Mitchell | ............... | E02D 3/032 |
| | | | | 405/179 |
| 2009/0304460 A1 * | 12/2009 | O'Dell | ............... | E02F 5/027 |
| | | | | 405/302.7 |

\* cited by examiner

POLY PIPE UNROLLING AND PLACEMENT DEVICE

CROSS-REFERENCE TO RELATED APPLICATIONS

This application claims priority to of U.S. Provisional Application Ser. No. 62/093,592 filed by Trussell on Dec. 18, 2014 entitled Poly Pipe Unrolling and Placement which is hereby incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in farm machinery associated with poly pipe irrigation. More particularly, the invention relates to improvements particularly suited for providing a controlled irrigation pipe placement. In particular, the present invention relates specifically to a device for creating a pipe trench, placement of the pipe in the trench, and partial burying of the uninflated pipe.

2. Description of the Known Art

As will be appreciated by those skilled in the art, poly pipes are known in various forms and unrolling has been a labor intensive endeavor such that an improved poly pipe installation device is needed to overcome these limitations.

SUMMARY OF THE INVENTION

The present invention is directed to a poly pipe installation device using a trenching tool for making a trench with side berms so that a poly pipe roll can be unwound to place the poly pipe into the trench. The poly pipe roll is supported off of a turntable that supports multiple pipe rolls so that long runs of pipe can be laid quickly. The poly pipe roll unrolls the pipe past a guide and under a wheel to position the pipe in the trench where it then partially buried with dirt drug off of the berms with angled drag chains. It is an object of this invention to quickly place polypipe for irrigation. Another object of this invention is to secure the polypipe in place to resist wind and other environmental factors until the pipe is filled with water. A still further object of this invention is to provide multiple rolls that can be easily positioned into place for unrolling to provide for reduced installation times for long runs of polypipe. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

As shown in FIGS. 1 through 6 of the drawings, one exemplary embodiment of the present invention is generally shown as a roll pipe placement device 100. The present invention is directed to a roll pipe placement device 100 for laying down a flattened poly pipe 12 from a spiral pipe roll 10 where the poly pipe 12 is wound around an axle tube 14. The roll pipe placement device 100 is constructed from a frame 200. The frame 200 includes a vertical front frame 200 connected by a left connecting gusset 300 and a right connecting gusset 302 to a horizontal back frame 400 that supports a pipe turntable 500. The pipe turntable 500 holds four rolls 10 which an unrolling position immediately behind the front frame 200. The other three rolls 10 are held in storage positions. By holding four rolls 10 at one quarter mile of pipe 12 per roll, the device 100 can hold one mile worth of irrigation poly pipe 12 at a time. After one roll 10 is depleted, the turntable 500 is rotated to move a roll 10 from a storage position into the deployment position and another quarter mile of pipe 12 can be placed. Each of these may be understood by looking at the construction of these parts of the device 100.

The roll pipe placement device 100 is mounted to a tractor using a three point hitch setup mounted on a vertical front frame 210. The vertical front frame 210 includes a bottom cross arm 212 and top cross arm 214 connected by a left side post 216 and a right side post 218. These form the base for mounting the three point hitch 220 and the placement for the top pin connection 222, left pin connection 224, and right pin connection 226.

The vertical front frame 210 is also used to mount the ditch plow 230 for forming a small ditch 20 in the ground 30. The ditch 20 is where the poly pipe 12 is laid to support the pipe 12 and keep the pipe 12 in position from moving around in the field where it is being used. The ditch plow 230 is constructed using a center vertical post 232 with an extendable lower leg 234. The a hydraulic plow ram 236 is used to control the extension of the extendable lower leg 234 out of the center vertical post 232 so that the operating depth of the ditch plow 230 can be controlled independently of the height of the vertical front frame 210 and the pipe placement wheel 428 that is discussed later. The hydraulic plow ram 236 is connected with a first plow ram hose 238 and a second plow ram hose 240 that are connected to a control valve 270. A plow foot is connected to the bottom of the extendable lower leg 234. The plow foot 242 includes a left angle face 244 and a right angle face 246 connected by a cross brace 248. When moved through the ground 30, the ditch plow 230 forms a ditch 20 with a bottom furrow 22 between a left side 24 and a right side berm 26. The pipe 12 will be laid in the bottom furrow 22 and then parts of the berms 24, 26 will be put on the pipe to hold the empty pipe 12 in place.

The vertical front frame 210 is also used to mount the outriggers shown as the outward frame 250 for storage of the device 100 and as a base for the roll lifting crane 253. The outward frame 250 includes a left arm 252 and a right arm 284.

The left arm 252 supports both a roll lifting crane 253 and is used to connect to the left ground leg 276.

The roll lifting crane 253 is used to lift the heavy spiral pipe rolls 10 up onto the pipe turntable 500. The roll lifting crane 253 includes a vertical crane arm 254 supporting an upper arm pivot 256 to pivotally support the pivoting lift arm 258. The pivoting lift arm 258 extends outward to support a roll lift chain 260 and spacer bar 262. The roll lift chain 260 is used to connect to the end lift loop 538 on the center roll axle 536 to lift the rolls 10 into position. Lifting is done using a hydraulic roll arm ram 264 that is triangularly connected between the pivoting lift arm 258 and the vertical crane arm 254. The hydraulic roll arm ram 264 is control via the first arm ram input hose 266 and second arm ram input hose 268 connected to the control valve 270. The control valve 270 is a dual function selective control valve typically used on tractors for front end loader or top and tilt control on three point implements. The hydraulic rams could be directly connected to the selective control valves on the tractor, but the present invention deemed a simple two hose connection to be more efficient. Thus, the present invention teaches a control valve 270 with a first tractor supply hose 272 and second tractor supply hose 274 just to use the tractor's hydraulic pump instead of having to duplicate a pumping system on the implement itself.

The left ground leg 276 is used as the first of three ground contact points for storage of the device 100. The left ground leg includes a left leg lock 278 controlling the position of the left height adjustable leg 280. A left ground foot 282 is connected to the bottom of the left height adjustable leg 280 to spread out the weight of the implement and give a lower ground contact pounds per square inch for storage of the device.

The right arm 284 supports the right ground leg 286 with a similar right leg lock 288, right height adjustable leg 290, and right foot 292.

The left connecting gusset 300 and right connecting gusset 302 are simple quarter inch thick plate gussets to strengthen the connection between the vertical front frame 210 and the arms 402, 404 of the horizontal back frame 400.

The horizontal back frame 400 includes a left horizontal arm 402 and a right horizontal arm 404. Connected across the arms 402, 404 are the bottom roll bar 406, turntable lock bar 416, wheel cross arm 424, first turntable cross arm 430, and second turntable cross arm 440.

The bottom roll bar 406 is used to guide the unrolling pipe 12 down under the wheel 428 to place the pipe in the bottom furrow 22. This makes sure that the pipe 12 always in front of and below the wheel 428 during the unrolling process, even when the roll spins past the usual take off point. The bottom roll bar 406 includes a left roll support 408 and right roll support 410 that pivotally mount the unrolling cross arm 414.

The turntable lock bar 416 is used to lock the turntable 500 in position for unrolling one of the four rolls being carried by the turntable 500. In this manner, when one roll 10 runs out, the turntable 500 is unlocked and another roll 10 is simply rotated into the front unrolling position using the turntable 500. The turntable lock bar 416 includes a lock handle catch 517 mounted off of the right horizontal arm for catching the lock handle 421 and holding the turntable lock bar 416 in a locked position. The lock handle 421 controls the rotation of the pivoting lock bar 422 and the upper lock extensions 423. The upper lock bar extensions 423 selectively engage with the U shaped extension catch 550 to lock the turntable 500 in position. The turntable lock bar 416 is pivotally mounted by the left lock support 418 and right lock support 420.

The wheel cross arm 424 is welded to the left horizontal arm 402 and right horizontal arm 404. The wheel cross arm 424 is used to mount the lower wheel supports 426 for pivotally mounting the pipe placement wheel 428 beneath the horizontal back frame 400. The wheel 428 engages the unrolling pipe 12 and guides it to the furrow bottom 22 and temporarily holds the unrolled pipe 12 in position. The first turntable cross arm 430 is welded to the left horizontal arm 402 and right horizontal arm 404. A left angled pipe burying drag chain 432 and a right angled pipe burying drag chain 434 drag across the left and right berms 24, 26 to drag dirt 28 back onto the pipe as it comes out from under the wheel 428. In this manner, the lightweight pipe 12 does not blow out of position in the wind and is held in the bottom furrow 22.

A second turntable cross arm 440 is welded to the left horizontal arm 402 and right horizontal arm 404 for additional strength for the frame 400. A rear ground leg 442 is mounted to the second turntable cross arm with a rear leg lock 444 holding a rear height adjustable leg 446. At the bottom of the rear height adjustable leg 446 is the rear ground foot 448. This is the third foot 282, 292, 448 that forms a three point plane for supporting the device 100 on the ground.

The pipe turntable 500 is designed to fit four rolls 10 of pipe 12 with a front unrolling position 600, two side storage positions 602, 604, and one back storage position 606. The pipe turntable 500 is supported off of a lower turntable post 502 connected to the first turntable cross arm 430 and the second turntable cross arm 440. The lower turntable post supports the pivoting upper turntable post 504 that rides on a bearing joint between the two pieces of pipe. The upper turntable point 504 supports the central pivot frame 506 made with a first table side frame 508 connected to a second table side frame 510 connected to a third table side frame 512 connected to a fourth table side frame 514 that is then connected back to the first table side frame 508. The table side frames 508, 510, 512, 514 are supported with a central pivot body 516 having post arms 522, 524, 526, 528 that extend to the table side frames and a center bearing 518 and extension flange 520 reinforcing the connection to the pivoting upper turntable post 504. The table post arms are shown as the first table post arm 522 holding the first roll support 530, the second table post arm 524 holding the second roll support 540, the third table post arm 526 holding the third roll support 542, and the fourth table post arm 528 holding the fourth roll support 544. Each roll support 530, 540, 542, 544 is constructed with a first roll side J arm 532 using a first axle pin 533 to support one end of a center roll axle 536 which then extends across to a second roll side J arm 534 securing the axle with a second axle pin 535. The center roll axle 536 terminated in an end lift loop 538 which keeps the axle in position in the J arms 532, 534 and can also be used to lift the roll 10 into position with the crane 253. Each roll support 530, 540, 542, 544 is constructed with a pair of U shaped extension catches 550 that use a rotating lock pin 552 to lock to the upper lock bar extensions 423 to secure the turntable 500 in the associated orientation while that roll is being used.

Figure 1:
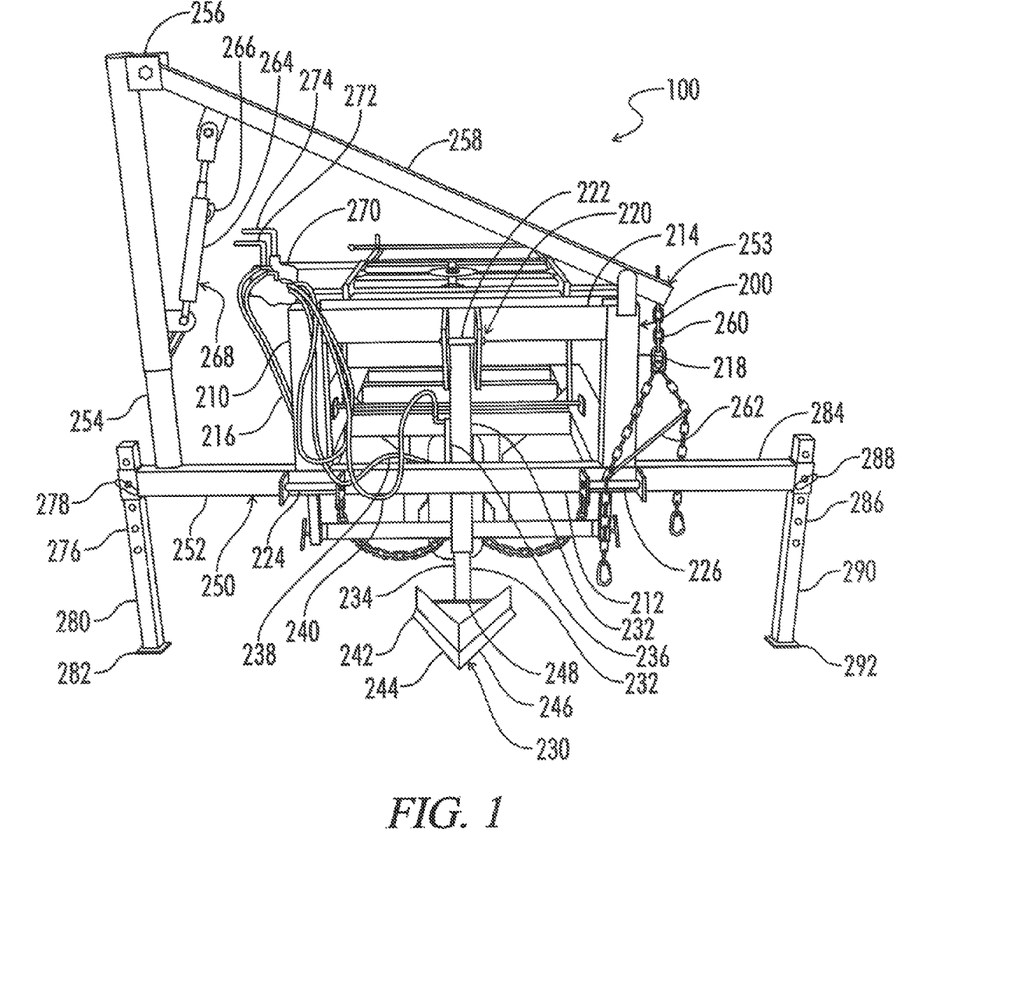
FIG. 1 is a front view of a roll pipe placement device.
Figure 2:
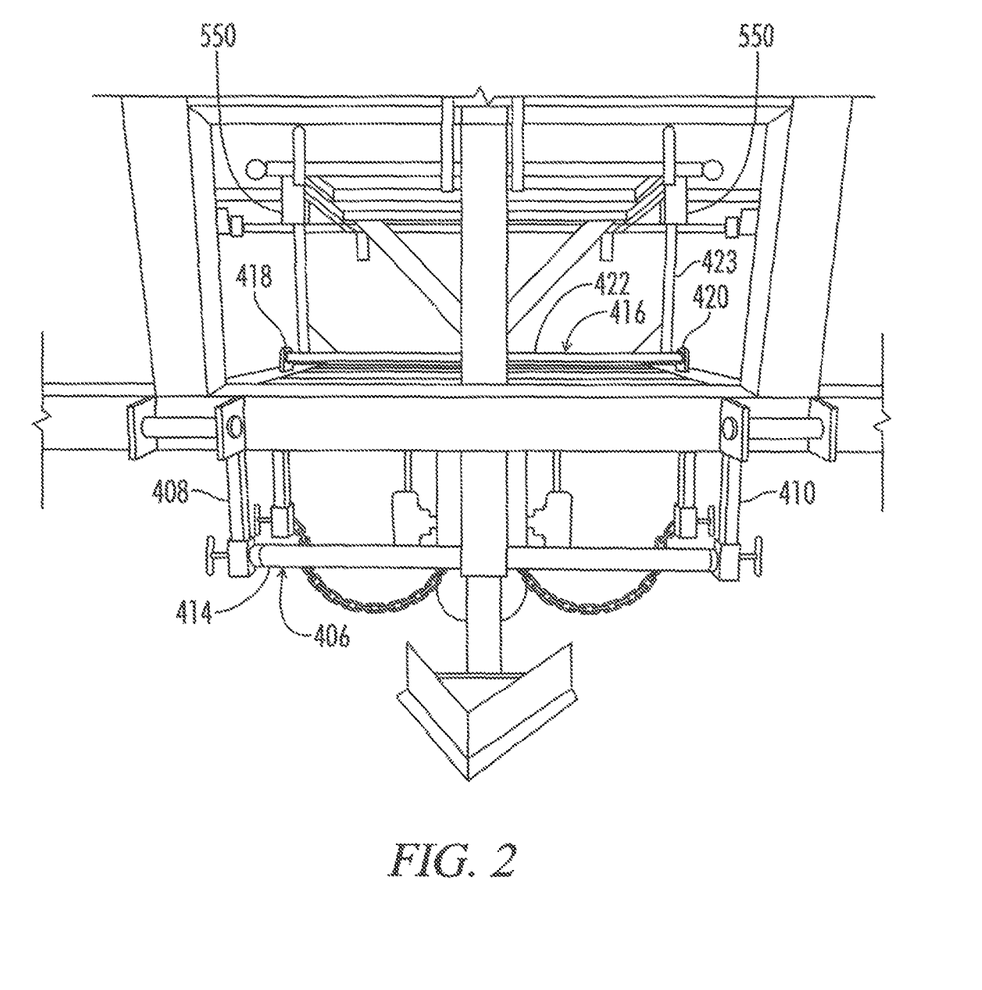
FIG. 2 is a magnified view of the roll pipe placement device of FIG. 1.
Figure 3:
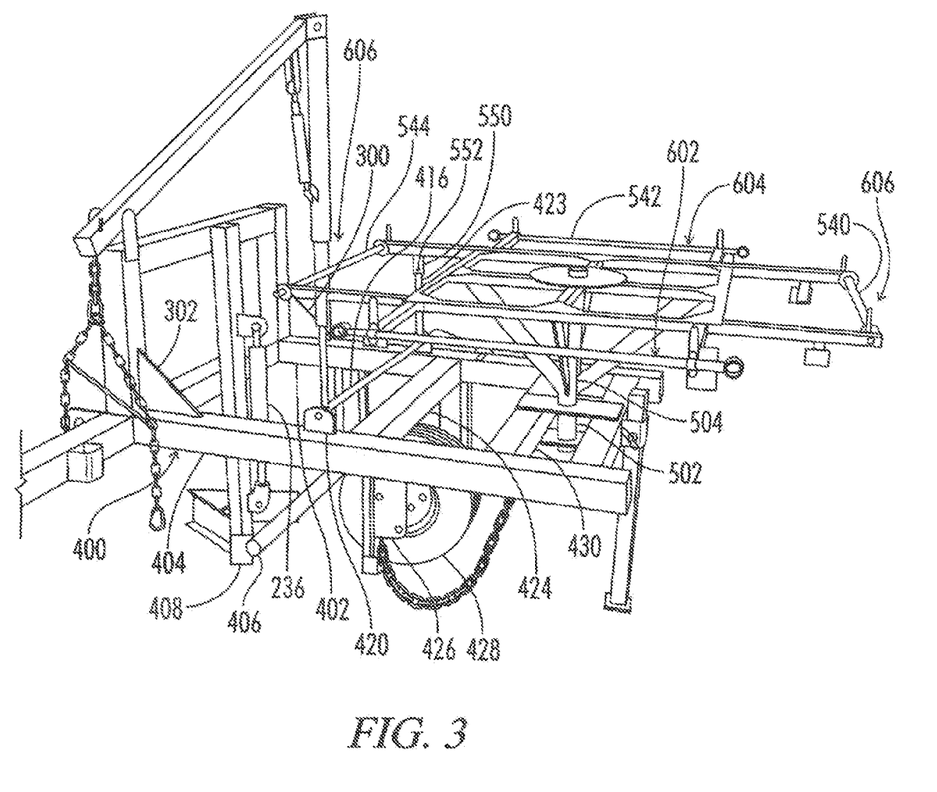
FIG. 3 is a side view of the roll pipe placement device.
Figure 4:
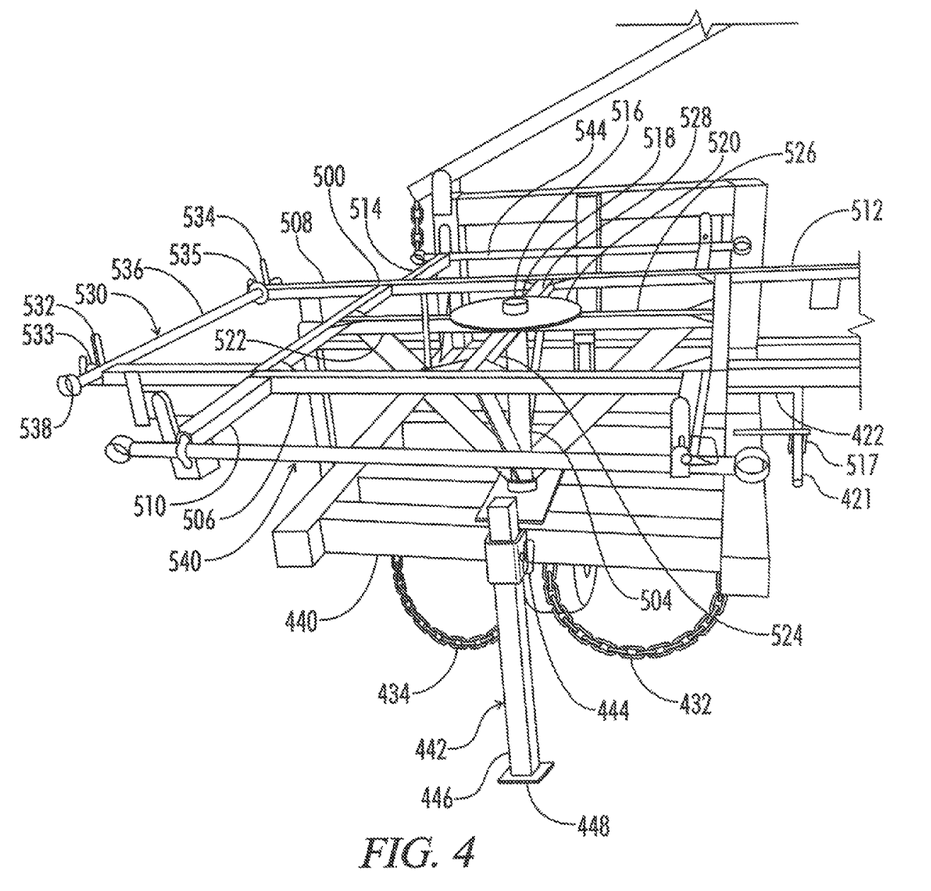
FIG. 4 is a back view of the roll pipe placement device.
Figure 5:
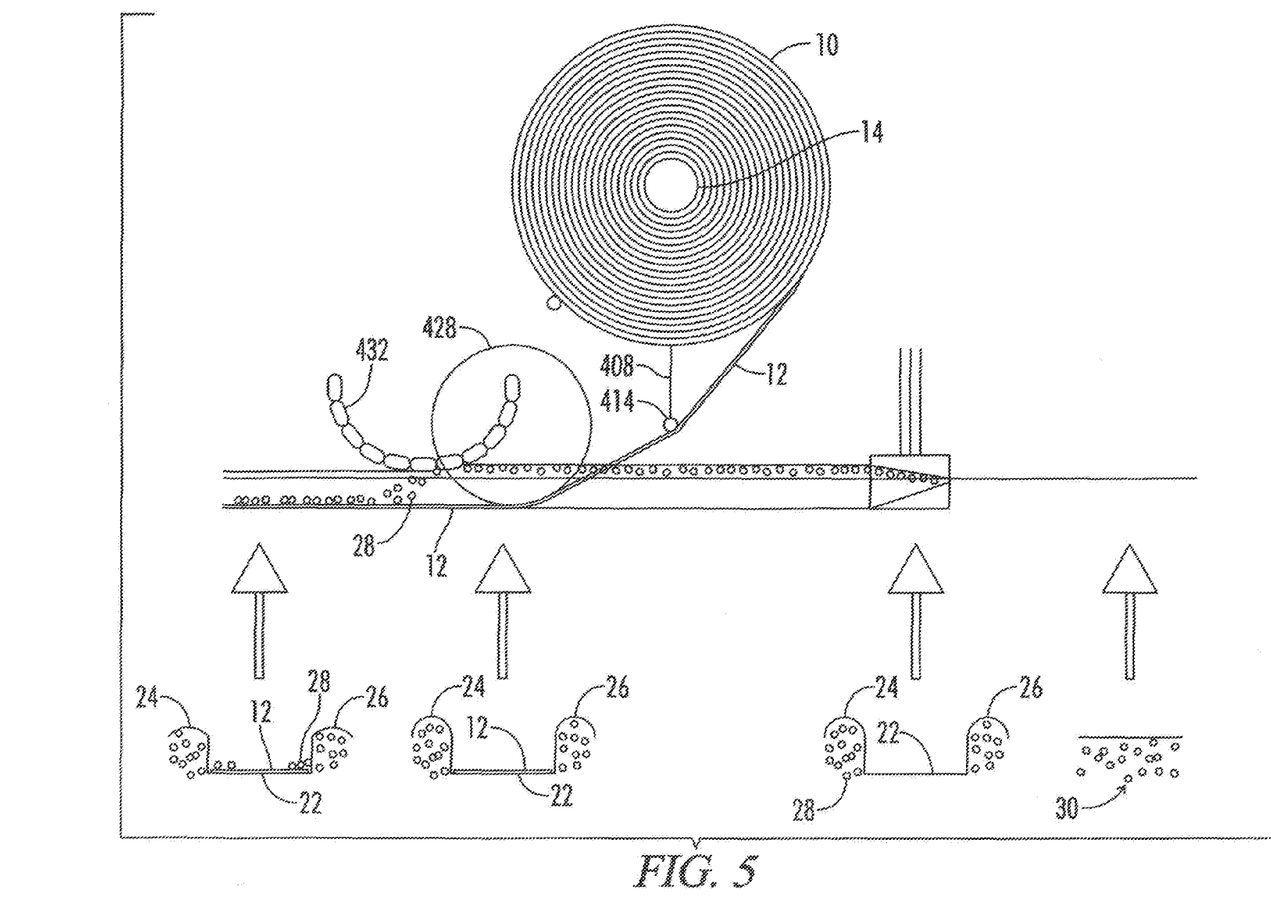
FIG. 5 is a schematic view showing the installation process.
Figure 6:
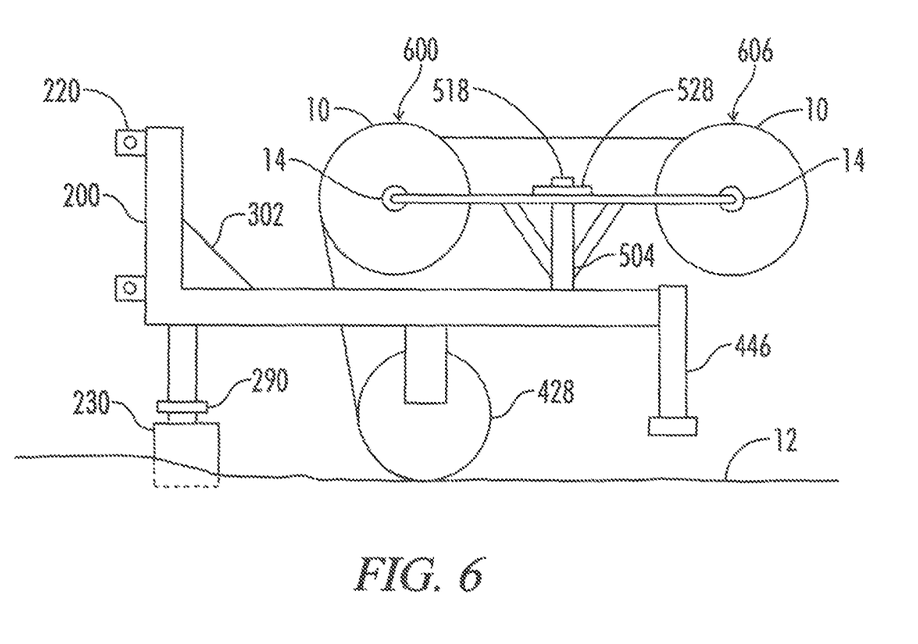
FIG. 6 is a schematic view of the roll on the placement device being deployed.

FIGS. 5 and 6 shows a schematic view of the operation of the roll pipe placement device 100 placing the pipe 12 into the ground 30. Beginning on the right side of the drawing, the plow 230 digs a trench or ditch 20 into the ground 30 with a bottom furrow 22 and berms 24, 26 on each side of the bottom furrow 22. The pipe 12 is then unwound off of the roll 10 past the unrolling guide bar 414 and the pipe 12 is positioned in the bottom furrow 22 by the wheel 428. The angled drag chains, with left chain 432 shown, then take part of the dirt 28 from the berms 24, 26 and drag the dirt 28 on top of the poly pipe 12 in the bottom furrow 22 of the ditch 20 to hold the pipe 12 in position. Once the pipe is filled with water it will generally remain in position, so this dirt is to hold it in position until the first irrigation is performed. By being placed in the bottom furrow 22 of the trench 30 and having the small amount of dirt 28 placed along the length of the pipe 12, the pipe 12 is partially secured from disturbance from wind, animals, or other disturbances while it is uninflated.

Reference numerals used throughout the detailed description and the drawings correspond to the following elements:

Spiral pipe roll 10
Poly pipe 12
Axle tube 14
ditch 20
bottom furrow 22
left side berm 24
right side berm 26
dirt 28
ground 30
Roll pipe placement device 100
Frame 200
Vertical front frame 210
Bottom cross arm 212
Top cross arm 214
Left side post 216
Right side post 218
Three point hitch 220
Top pin connection 222
Left pin connection 224
Right pin connection 226
Ditch plow 230
Center vertical post 232
Extendable lower leg 234
Hydraulic plow ram 236
First plow ram input hose 238
Second plow ram input hose 240
Plow foot 242
Left angle face 244
Right angle face 246
Cross brace 248
Outward frame 250
Left arm 252
Roll lifting crane 253
Vertical crane arm 254
Upper arm pivot 256
Pivoting lift arm 258
Roll lift chain 260
Spacer bar 262
Hydraulic roll arm ram 264
First arm ram input hose 266
Second arm ram input hose 268
Control valve 270
First tractor supply hose 272
Second tractor supply hose 274
Left Ground leg 276
Left leg lock 278
Left height adjustable leg 280
Left ground foot 282
Right arm 284
Right Ground leg 286
Right leg lock 288
Right height adjustable leg 290
Right foot 292
Left connecting gusset 300
Right connecting gusset 302
Horizontal back frame 400
Left horizontal arm 402
Right horizontal arm 404
Roll bar 406
Left roll support 408
Right roll support 410
Unrolling cross arm 414
Turntable lock bar 416
Lock handle catch 517
Left lock support 418
Right lock support 420
Lock handle 421
Pivoting lock bar 422
Upper lock extensions 423
Wheel cross arm 424
Lower wheel supports 426
Pipe placement wheel 428
First turntable cross arm 430
First angled pipe burying drag chain 432
Second angled pipe burying drag chain 434
Second turntable cross arm 440
Rear ground leg 442
Rear leg lock 444
Rear height adjustable leg 446
Rear ground foot 448
Pipe turntable 500
Lower turntable post 502
Pivoting Upper turntable post 504
Central pivot frame 506
First table side frame 508
Second table side frame 510
Third table side frame 512
Fourth table side frame 514
Central pivot body 516
Center bearing 518
Extension flange 520
First table post arm 522
Second table post arm 524
Third table post arm 526
Fourth table post arm 528
First roll support 530
First roll side J arm 532
First axle pin 533
Second roll side J arm 534
Second axle pin 535
Center roll axle 536
End lift loop 538
Second roll support 540
Third Roll Support 542
Fourth Roll Support 544

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A pipe placement apparatus for ground placement of a flattened poly pipe provided wound around an axle tube to form a pipe roll, the apparatus comprising:
   a frame;
   a roll axle supported by the frame, the roll axle supporting the axle tube;
   a placement wheel supported by the frame, the placement wheel frictionally engaging the flattened poly pipe with the ground to unroll the poly pipe; and
   a turntable supported off of the frame, the turntable rotationally supporting multiple pipe rolls.

* * * * *